June 19, 1934.  M. ASSAEL  1,963,110
METHOD AND MEANS FOR PROJECTING COLORED IMAGES
Filed May 6, 1932
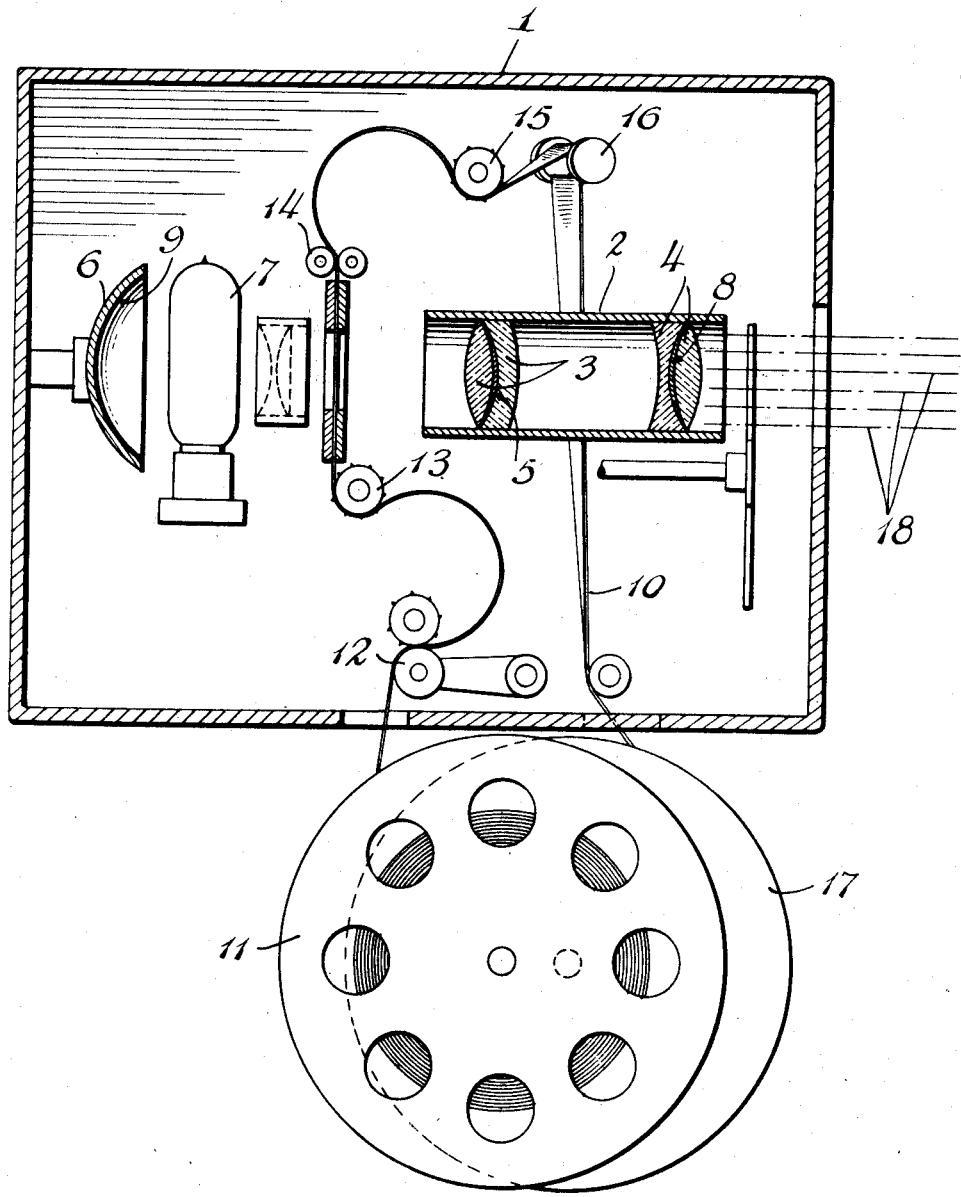
INVENTOR
MAURICE ASSAEL
BY
Oscar A. Geier
ATTORNEY Patented June 19, 1934

1,963,110

UNITED STATES PATENT OFFICE 1,963,110

METHOD AND MEANS FOR PROJECTING COLORED IMAGES

Maurice Assael, New York, N. Y., assignor to Multi-Color Arts, Inc., New York, N. Y., a corporation of New York Application May 6, 1932, Serial No. 609,625

3 Claims. (Cl. 88—24)

This invention refers to a method and means for projecting colored images, and relates more particularly to a method and means for projecting on a screen images of a color other than black or white, for instance, for colored moving pictures.

An object of this invention is to provide cheap, simple and efficient means for reproducing colored images on a screen.

Another object is to provide an inexpensive and simple method of projecting on a screen images of bright and effective coloring.

A further object is to project on a screen an image, parts of which are brightly and effectively colored, while other parts have practically no coloring whatsoever.

It has been found that in order to produce a well colored picture the rays of light falling upon a screen must be as bright and as clear as possible; it is quite difficult, however, to obtain this result by placing a colored photographic plate or film in the path of a white ray of light. If a lightly colored film or plate is placed in the path of a beam of white light, light rays of other colors than the desired ones pass through said plate or film, so that the picture projected on a screen appears practically white. On the other hand, should the plate or film be of a deeper coloring, the amount of light passing through it is not sufficient to produce a clearly defined and bright picture on the screen. The light is diffused so that the picture appears dim and misty, and the gray parts of the film appear to have just as much coloring as the light parts.

I have found that this drawback can be eliminated by a partial absorption of some of the light rays and/or by a combination of other light rays during their passage through the projection apparatus. In order to preserve the brightness of the picture and to eliminate as much loss as possible, I dispense with all supplementary devices, employing instead the usual parts of an ordinary projection apparatus with this exception, that some of said parts are made of glass or other translucent substance having the desired light-coloring. A particular advantage is gained by the use of glass, since it is then possible to maintain high temperatures within the projection apparatus without affecting the coloring of said parts.

According to my invention a light-colored film is used in a projection apparatus provided with a light-colored objective. This is accomplished by the use of lenses, some or all of which are made of light-colored glass, or by covering at least one lens surface with a colored translucent substance, or by adding a colored pigment to the substance which is used in cementing the surfaces of the lenses one against the other. In addition I use a bulb of light-colored glass for the lamp of the projection apparatus or a light-colored light condenser for electrical arc light. Finally, I provide a colored projecting mirror by making it of colored glass, or by any other means.

In other words, I provide means for projecting light-colored images comprising four colored articles, these four articles being the film or the plate, the objective or a part of the same, the bulb of the projector lamp or the light condenser and the projecting mirror; each of these four colored articles may be of the same color or each of the same combination of different colors. On the other hand, one or more of these colored articles may be of a different color than the rest, provided that the coloring is a very light one; for instance, one of the articles may be pale rose, while another article may be pale pink. If these articles are of different light colors, at least some of them should comprise many colors in the same or a different combination than the colors of the other articles.

In some cases it may be sufficient to use only two or three colored articles, the remaining article, or articles, being transparent to all rays of light.

I prefer to use a plate or film, which has been colored during the preparation of the cellulosic mass or the basic transparent material before said mass or basic material has been coated with the sensitized layer, and before the picture has been reproduced in said sensitized layer.

While pictures of any desired color or colors may be produced by my method, I have found that it is particularly effective for cinematographic close-ups, wherein the heads and the hands of the artists are shown in the natural flesh color. It is essential in this case that the film, the lens, the lamp and the mirror be of a light flesh color in order to produce a good picture. The head and the hands of an artist will then be effectively and brilliantly colored, while the gray and shadowy parts of the picture will have practically no coloring whatsoever.

The coloring substances used for coloring the lamp, the lens and other parts of the projecting apparatus must consist of materials that can withstand the temperature of several hundred degrees while the apparatus is in operation.

The invention will appear more clearly from the following detailed description when taken in connection with the accompanying drawing showing a preferred embodiment of the inventive idea.

The drawing shows diagrammatically a projecting apparatus in vertical section.

In the drawing the casing 1 of the projecting apparatus contains an objective 2 consisting of two lenses 3 and 4. The lens 3 consists of two parts glued together by a glue 5, which is slightly colored in one or many colors, for instance, very light flesh-color. The glue 8 used for glueing together the two parts of the lens 4 is slightly colored in the same or any other color or colors. A projecting mirror 6 and a source of light 7 are supported within the casing 1. The light condenser, or the bulb 7, is made entirely of slightly colored glass, or may be constructed in any other way that will give a colored lighting effect. The surface of the mirror 6 is provided with a coating 9 which may be of a very light flesh color, or any other color or colors. A colored film 10 wound on a reel 11 passes over guide rollers 12, 13, 14, 15 and 16 and is wound upon a reel 17.

The effect upon the screen of rays of light 18 that have already passed through the colored lamp 7, mirror 6, film 10 and lenses 3 and 4 is one of brilliant and natural colors. Those portions of the picture which were black remain black, those which were white remain practically white, those which were shadowy are rendered even more effective, and the colored portions assume their color combinations in accordance with the desired colored rays produced in the projection apparatus.

What is claimed is:

1. A method of projecting colored images, comprising providing a lightly colored ray of light, reflecting said ray of light by a mirror of the same light color, passing said ray of light through a translucent film of the same light color, and then passing said ray of light through an objective, a part at least of said objective being of the same light color.

2. Means for projecting colored images, comprising in combination, means for producing a ray of light, a projecting mirror of a light color, a translucent film of the same light color situated in the path of the projected ray of light, and an objective, a part at least of said objective being of the same light color.

3. Means for projecting colored images, comprising in combination, a lamp having a bulb of predetermined colors, a projecting mirror having a plurality of colors, a translucent colored film situated in the path of the projected ray of light, and a colored objective situated in the path of the projected ray of light.

MAURICE ASSAEL.